(12) United States Patent
Losh et al.

(10) Patent No.: US 11,294,505 B2
(45) Date of Patent: *Apr. 5, 2022

(54) DISPLAY INTERFERENCE MITIGATION

(71) Applicant: SYNAPTICS INCORPORATED, San Jose, CA (US)

(72) Inventors: Jonathan Losh, Mountain View, CA (US); Derek Solven, Coquitlam (CA); Vladan Petrovic, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/905,780

(22) Filed: Jun. 18, 2020

(65) Prior Publication Data

US 2021/0096686 A1 Apr. 1, 2021

Related U.S. Application Data

(60) Provisional application No. 62/907,165, filed on Sep. 27, 2019.

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 3/0444* (2019.05); *G06F 3/0445* (2019.05)

(58) Field of Classification Search
CPC .. G06F 3/0418; G06F 3/0412; G06F 3/04166; G06F 3/0444; G06F 3/0445; G06F 3/0446; G09G 3/3275; G09G 2320/0626; G09G 2370/22; G09G 3/3208; G09G 2330/06

See application file for complete search history.

(56) References Cited

U.S. PATENT DOCUMENTS

| 8,907,921 B2 | 12/2014 | Reynolds |
| 9,075,259 B2 | 7/2015 | Kim |
| 9,182,847 B2 | 11/2015 | Lee et al. |
| 9,275,611 B2 | 3/2016 | Kim |
| 9,298,314 B2 | 3/2016 | Knausz et al. |
| 9,329,725 B2 | 5/2016 | Pyo et al. |

(Continued)

FOREIGN PATENT DOCUMENTS

| KR | 20150078334 A | 7/2015 |
| KR | 20160005872 A | 1/2016 |

OTHER PUBLICATIONS

U.S. Appl. No. 16/453,694, filed Jun. 26, 2019.

*Primary Examiner* — Md Saiful A Siddiqui
(74) *Attorney, Agent, or Firm* — Leydig, Voit & Mayer, Ltd.

(57) ABSTRACT

A sensor driver comprises a receiver and an interference mitigation element. The receiver is configured to acquire a resulting signal from a sensor electrode. The interference mitigation element is communicatively coupled with the receiver and is configured to receive interference data, generate an interference estimate from the interference data and a transfer function, and communicate the interference estimate to the receiver. The interference estimate removes charge from a resulting signal, mitigating effects of interference within the resulting signal.

20 Claims, 8 Drawing Sheets

(56) References Cited

U.S. PATENT DOCUMENTS

| | | |
|---|---|---|
| 9,367,189 B2 | 6/2016 | Morein et al. |
| 9,501,193 B2 | 11/2016 | Schwartz et al. |
| 9,645,670 B2 | 5/2017 | Khazeni et al. |
| 9,886,129 B2 | 2/2018 | Kim et al. |
| 9,946,404 B1 | 4/2018 | Berget et al. |
| 2007/0040770 A1 | 2/2007 | Kim |
| 2008/0157893 A1* | 7/2008 | Krah .................... G06F 3/0446 |
| | | 331/177 R |
| 2012/0139846 A1 | 6/2012 | Krah et al. |
| 2013/0194229 A1 | 8/2013 | Sabo et al. |
| 2014/0015678 A1* | 1/2014 | Zribi .................... G08B 29/183 |
| | | 340/589 |
| 2014/0015768 A1* | 1/2014 | Karpin .................... G06F 3/044 |
| | | 345/173 |
| 2014/0049507 A1 | 2/2014 | Shepelev et al. |
| 2014/0306906 A1 | 10/2014 | Huang et al. |
| 2015/0002463 A1* | 1/2015 | Kanazawa ............ G06F 3/0446 |
| | | 345/174 |
| 2015/0220206 A1 | 8/2015 | Knausz et al. |
| 2016/0162074 A1 | 6/2016 | Huang |
| 2016/0188034 A1* | 6/2016 | Bayramoglu ....... G06F 3/04164 |
| | | 345/174 |
| 2017/0090671 A1 | 3/2017 | Khazeni et al. |
| 2017/0123552 A1 | 5/2017 | Brunet et al. |
| 2017/0192605 A1* | 7/2017 | Goudarzi ............ G06F 3/0418 |
| 2018/0108717 A1 | 4/2018 | Seol et al. |
| 2018/0239493 A1 | 8/2018 | Khazeni et al. |
| 2019/0102017 A1* | 4/2019 | Kim ........................ G06F 3/044 |
| 2020/0201475 A1 | 6/2020 | Mani et al. |

* cited by examiner

DISPLAY INTERFERENCE MITIGATION

CROSS REFERENCE TO RELATED APPLICATIONS

This application claims the benefit of U.S. provisional patent application Ser. No. 62/907,165, filed Sep. 27, 2019, which is hereby incorporated herein by reference.

BACKGROUND

Field

The disclosure herein is generally related to electronic devices, and more specifically, to reducing interference in input devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also be used in smaller computing systems, such as touch screens integrated in cellular phones. Additionally, proximity sensor devices may be implemented as part of a multimedia information system of an automobile.

SUMMARY

In one embodiment a sensor driver comprises a receiver and an interference mitigation element. The receiver is configured to acquire a resulting signal from a sensor electrode. The interference mitigation element is communicatively coupled with the receiver. The interference mitigation element is configured to receive interference data, generate an interference estimate from the interference data and a transfer function, and communicate the interference estimate to the receiver.

In one embodiment, an input device comprises a sensor electrode and a processing system. The processing system comprises a sensor driver communicatively coupled to the sensor electrode. The sensor driver comprises a receiver configured to acquire a resulting signal from the sensor electrode. The sensor driver further comprises an interference mitigation element communicatively coupled with the receiver. The interference mitigation element is configured to receive interference data and generate an interference estimate from the interference data and a transfer function. The interference mitigation element communicates the interference estimate to the receiver.

In one embodiment, a method for mitigating interference comprises acquiring, by a receiver, a resulting signal from a sensor electrode, and receiving, by an interference mitigation element, interference data. The method further comprises generating, by the interference mitigation element, an interference estimate from the interference data and a transfer function, and communicating the interference estimate from the interference mitigation element to the receiver.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
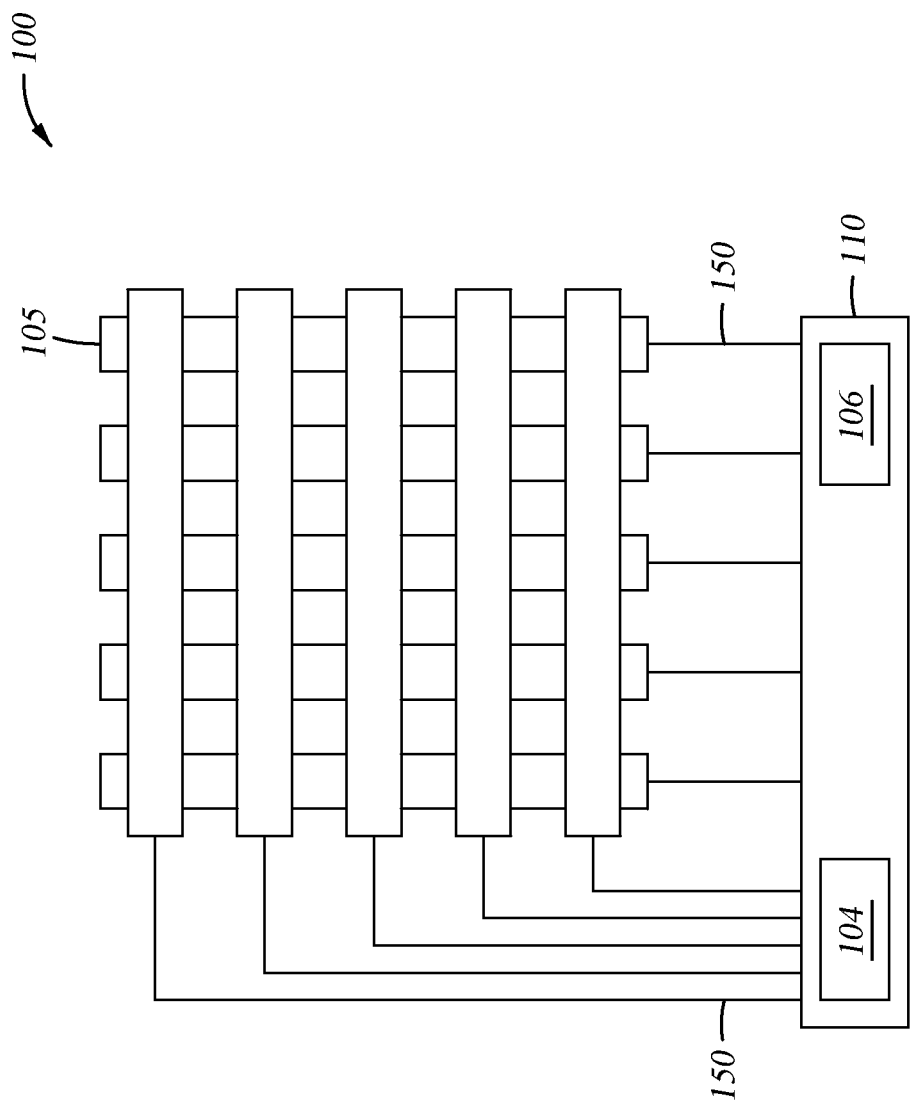
FIG. 1 is a schematic block diagram of an input device, according to one or more embodiments.
Figure 1:
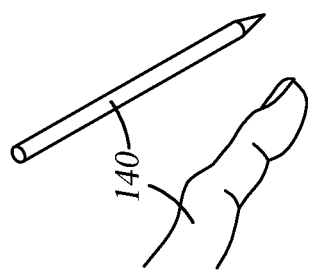

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Resulting signals received from sensor electrodes while performing capacitive sensing may be affected by interference from an external device. For example, when the sensor electrodes are disposed over a display device, the resulting signals are affected by display interference generated when updating the display device. The interference may undesirably affect the resulting signals received from the sensor electrodes, making it difficult for input object detection to be to be accurately performed. However, interference data provided by the external device may be utilized to mitigate effects of the interference. The interference data may be data signals of a display device. Mitigating the effects of the interference increases the ability for the input device to reliably detect the input objects.

FIG. 1 illustrates input device 100 configured to reduce interference affecting a sensing device. The input device 100 may be configured to provide input to an electronic system (not shown). Some non-limiting examples of electronic systems include desktop computers, laptop computers, netbook computers, tablets, terminals, kiosks, cellular phones, automotive multimedia information systems and internet of things (IoT) devices, among others.

The input device 100 includes a processing system 110 and sensor electrodes 105. The processing system 110 operates the sensor electrodes 105 to detect one or more input objects 140 in a sensing region of the input device 100. Example input objects 140 include fingers, active pens, and styli, among others, as shown in FIG. 1. The sensing region of the input device 100 encompasses any space above, around, in and/or near the input device 100 in which the input device 100 is able to detect user input, e.g., user input provided by one or more input objects 140.

The sensor electrodes 105 are coupled to the processing system 110 via traces 150. The exemplary pattern of the sensor electrodes 105 illustrated in FIG. 1 comprises an array of sensor electrodes 105 disposed in a plurality of rows and columns. It is contemplated that the sensor electrodes 105 may be arranged in other patterns, such as polar arrays, repeating patterns, non-repeating patterns, non-uniform arrays, or other suitable arrangement. The sensor electrodes 105 may have a shape that is circular, rectangular, diamond, star, square, nonconvex, convex, nonconcave concave, or other suitable geometry.

The sensor electrodes 105 may be disposed in one or more layers. For example, a portion of the sensor electrodes 105 may be disposed on a first layer and another portion of the sensor electrodes may be disposed on a second layer. The first and second layers may be different sides of a common substrate, or different substrates. Alternatively, the sensor electrodes 105 may be disposed in a common layer.

The sensor electrodes 105 may be comprised of a conductive material such as a metal mesh, indium tin oxide (ITO), or the like. Further, the sensor electrodes 105 are ohmically isolated from each other. That is, one or more insulators separate the sensor electrodes and prevent them from electrically shorting to each other.

The processing system 110 includes a sensor driver 104. Further, as will be described in more detail below, the processing system 110 may include a determination module 106. The processing system 110 operates the sensor electrodes 105 to detect one or more input objects 140 in the sensing region of the input device 100. The processing system 110 fully or partially resides in one or more integrated circuit (IC) chips. For example, the processing system 110 may reside in a single IC chip. Alternatively, the processing system 110 includes multiple IC chips. The sensor driver 104 is coupled to the sensor electrodes 105 via the routing traces 150 and is configured to drive the sensor electrodes 105 with sensing signals to detect one or more input objects 140 in the sensing region of the input device 100.

The sensor driver 104 includes digital and/or analog circuitry. For example, the sensor driver 104 comprises transmitter (or driver) circuitry to drive sensing signals onto the sensor electrodes 105 and receiver circuitry to receive resulting signals from the sensor electrodes 105. The transmitter circuitry may include one or more amplifiers and/or one or more modulators to drive sensing signals on to the sensor electrodes 105. The receiver circuitry may include integrators, filters, sample and hold circuitry, and analog-to-digital converters (ADCs), among others, to receive resulting signals from the sensor electrodes 105.

In one embodiment, the sensor driver 104 drives a first one or more of the sensor electrodes 105 with a transcapacitive sensing signal, and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) approaches the sensor electrodes. Driving the sensor electrodes 105 with transcapacitive sensing signals comprises modulating the sensor electrodes 105 relative to a reference voltage, e.g., system ground.

The transcapacitive sensing signal is a periodic or aperiodic signal that varies between two or more voltages. Further, the transcapacitive sensing signal has a frequency between 100 kHz and 1 MHz. In other embodiments, other frequencies may be utilized. The transcapacitive sensing signal has a peak-to-peak amplitude in a range of about 1 V to about 10 V. However, in other embodiments, the transcapacitive sensing signal has other peak-to-peak amplitudes. Additionally, the transcapacitive sensing signal may have a square waveform, a sinusoidal waveform, a triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In one embodiment, the sensor driver 104 operates the sensor electrodes 105 for absolute capacitive sensing by driving a first one or more of the sensor electrodes 105 with an absolute capacitive sensing signal and receiving a resulting signal with the driven sensor electrode or electrodes. Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered in response to an input object (e.g., the input object 140) interacting with the sensor electrodes.

The absolute capacitive sensing signal is a periodic or aperiodic signal that varies between two or more voltages. Further, the absolute capacitive sensing signal has a frequency between 100 kHz and 1 MHz. In other embodiments, other frequencies may be utilized. Additionally, the absolute capacitive sensing signal has a square waveform, a sinusoidal waveform, a triangular waveform, a trapezoidal waveform, or a sawtooth waveform, among others. The absolute capacitive sensing signal has a peak-to-peak amplitude in a range of about 1 V to about 10 V. However, in other embodiments, the absolute capacitive sensing signal has other peak-to-peak amplitudes.

Driving the sensor electrodes 105 with an absolute capacitive sensing signal comprises modulating the sensor electrodes 105. A resulting signal received while performing absolute capacitive sensing comprises effect(s) corresponding to one or more absolute capacitive sensing signals, and/or one or more sources of environmental interference, e.g., other electromagnetic signals. As will be described in greater detail below, a source of environmental interference may be display update signals driven by display electrodes of a display device. The absolute capacitive sensing signal may be the same or different from the transcapacitive sensing signal.

The processing system 110 further includes a determination module 106 that receives processed resulting signals from the sensor driver 104 and further processes the processed resulting signals to determine changes in capacitive coupling of the sensor electrodes 105. The changes in capacitive coupling are changes in absolute capacitive coupling of the sensor electrodes 105 and/or changes in transcapacitive coupling between the sensor electrodes 105. The determination module 106 utilizes the changes in capacitive coupling of the sensor electrodes 105 to determine positional information of one or more input objects (e.g., the input object 140) relative to the sensor electrodes 105.

The measurements of the changes in capacitive coupling are utilized by the determination module 106 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing region of the input device 100. For example, successive capacitive images acquired over successive periods of time can be used to track the motion(s) of one or more input objects entering, exiting, and within the sensing region of the input device 100.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
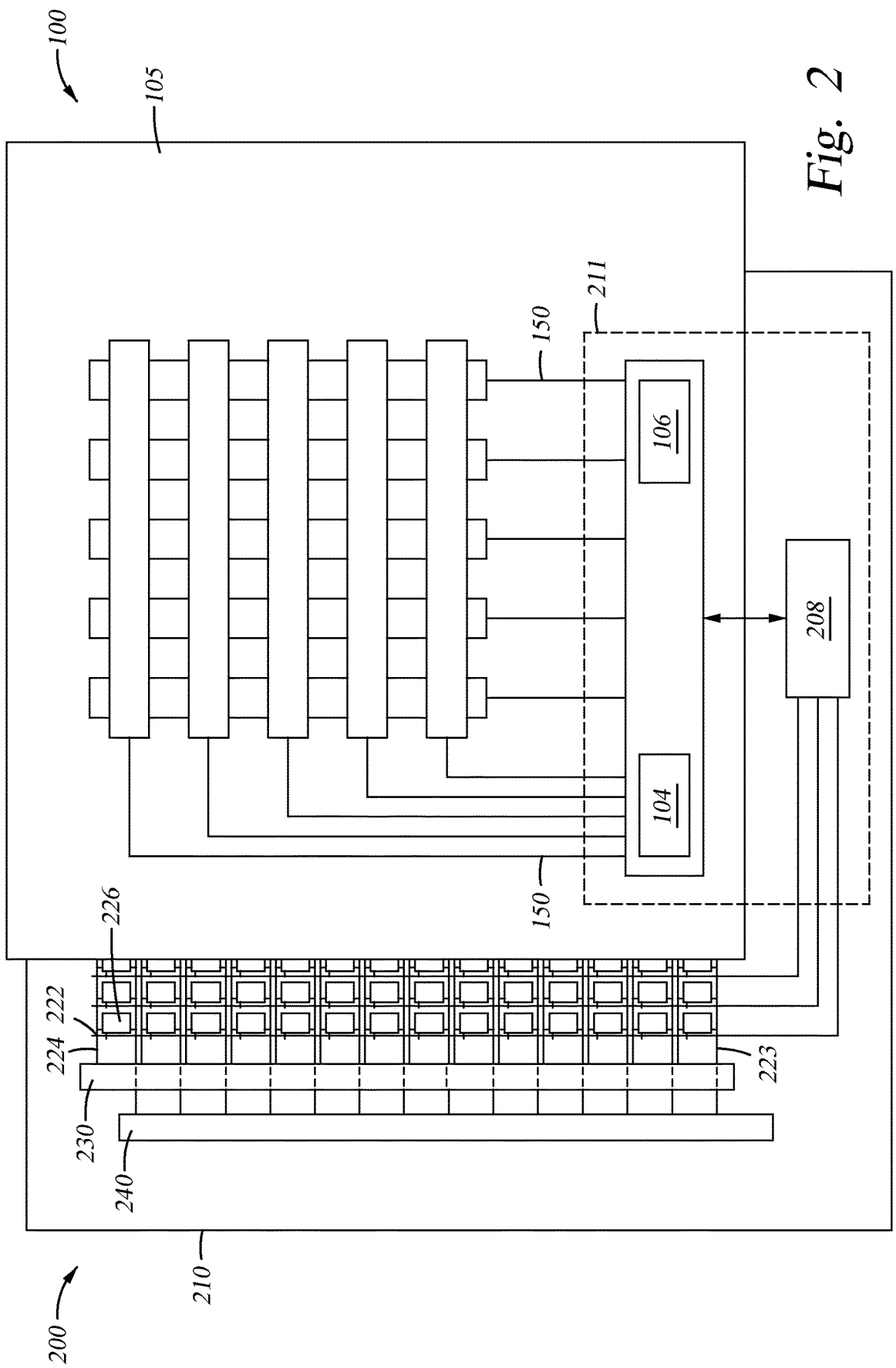
FIG. 2 illustrates an example display device and an input device, according to one or more embodiments.

The input device 100 may a touch screen interface that overlaps at least part of a display panel of a display device. For example as illustrated in FIG. 2, the input device 100 is shown overlapped with a display panel 210 of a display device 200. The display panel 210 is communicatively coupled with a display driver 208 and gate selection circuitry 230. The display panel 210 includes display electrodes that are driven to update the display panel 210. The display electrodes include data lines 222, gate lines 224, emission control lines 223, subpixel electrodes 226, and/or a cathode electrode (e.g., cathode electrode 340 of FIG. 3), among others.

The data lines 222 are coupled to the display driver 208 and the gate lines 224 are coupled to the gate selection circuitry 230. Further, the emission control lines 223 are coupled to the emission control circuitry 240. The emission control circuitry 240 is illustrated on the same side of the display panel 210 as the gate selection circuitry 230, however, in other embodiments, the emission control circuitry 240 is disposed on a side of the display panel 210 opposite the that on which the gate selection circuitry 230 is disposed. Further, as illustrated, the emission control lines 223 are coupled to the emission control circuitry 240 and not the gate selection circuitry 230. For example the emission control lines 223 pass under, over and/or around the gate selection circuitry 230 and they are connected to the emission control circuitry 240. Each of the subpixel electrodes 226 is coupled to one of the gate lines 224 and one of the data lines 222. Each of the subpixel electrodes 226 is coupled to an emission control line 223. However, in one or more embodiments, the emission control lines 223 may be omitted.

The gate selection circuitry 230 is configured to drive gate select and gate deselect signals onto the gate lines 224 to select (activate) and deselect (deactivate) corresponding subpixels for updating. Further, the emission control lines 223 are driven by emission control circuitry 240 to control the brightness of the subpixel electrodes 226.

The display driver 208 includes display driver circuitry configured to drive the data lines 222 with subpixel data signals to update the selected subpixels electrodes 226 and update the display panel 210 of the display device 200. For example, the display driver 208 may drive subpixel data signals onto the data lines 222 to update selected (activated) subpixel electrodes 226 during corresponding display updating periods. The subpixel data signals may be voltage signals.

The display driver 208 is configured to update the subpixel electrodes 226 to update an image displayed on the display panel 210 during display frames. The display frames may be updated, or refreshed, once about every 16 ms, generating a display refresh rate of about 60 Hz. Alternatively, other display refresh rates may be employed. For example, the display refresh rate may be 90 Hz, 120 Hz, 140 Hz, 240 Hz or greater.

The display driver 208, the sensor driver 104, and the determination module 106 may be part of a common processing system (e.g., a processing system 211 that incorporates the processing system 110). Alternatively, the display driver 208 may be part of a first processing system and the sensor driver 104 and the determination module 106 may be part of a second processing system (i.e., the processing system 110). Further, the display driver 208, the sensor driver 104, and the determination module 106 may be part of a common IC chip. Alternatively, one or more of the display driver 208, the sensor driver 104, and the determination module 106 are disposed within a first IC chip and a second one or more of the display driver 208, the sensor driver 104, and the determination module 106 are disposed on a second IC chip.

The sensor driver 104 is configured to drive the sensor electrodes 105 for capacitive sensing during a capacitive frame at a capacitive frame rate. During each capacitive frame, sensor electrodes 105 are operated for capacitive sensing. Further, each capacitive frame may include multiple periods during which different sensor electrodes 105 are operated for capacitive sensing.

The "capacitive frame rate" (the rate at which successive capacitive images are acquired) may be the same or different from that of the "display frame rate" (the rate at which the display panel 210 is updated). The capacitive frame rate is an integer multiple of the display frame rate. Alternatively, the capacitive frame rate is a fractional multiple of the display frame rate. Further, the capacitive frame rate may be any fraction or multiple of the display frame rate. In one or more embodiments, the capacitive frame rate may be a rational fraction of the display frame rate (e.g., ½, ⅔, 1, 3/2, or 2, among others). The display frame rate may change while the capacitive frame rate remains constant. The display frame rate may remain constant while the capacitive frame rate is increased or decreased. Alternately, the capacitive frame rate may be unsynchronized from the display frame rate or the capacitive frame rate may be a non-rational fraction of the display frame rate to minimize interference "beat frequencies" between the display updating and the input sensing.

Input sensing and updating of the display panel 210 (e.g., display updating) occur during at least partially overlapping periods. For example, the sensor electrodes 105 are operated for capacitive sensing while the gate lines 224 and data lines 222 are operated to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

Updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of a subsequent display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figure 3:
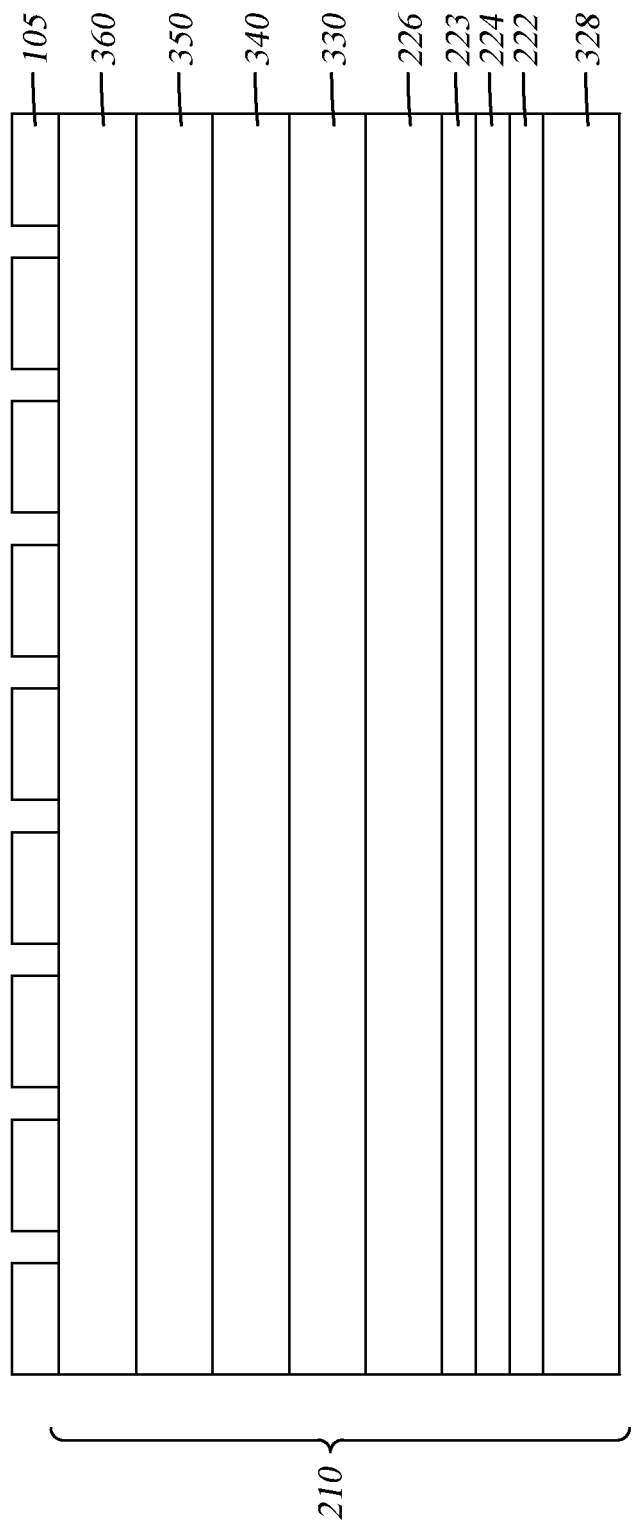
FIG. 3 is a partial side view of an example display device and input device, according to one or more embodiments.

FIG. 3 illustrates a partial side view of the input device 100 and the display device 200, according to one or more embodiments. In the embodiment of FIG. 3, the display panel 210 is an organic light emitting diode (OLED) display panel. However, in other embodiments, other display types (e.g., liquid crystal displays (LCDs) or the like) may be utilized.

The display panel 210 includes a substrate 328, organic material layers 330, a cathode electrode 340, display layers 350, and an encapsulation layer 360. The cathode electrode 340 is a sheet of resistive material configured to overlap the subpixel electrodes 226. The cathode electrode 340 is coupled with and driven by the display driver 208 to supply a low impedance reference voltage. In embodiments where the display panel 210 is an LCD panel, the cathode electrode 340 is replaced with a common voltage (Vcom) electrode. Further, the cathode electrode 340 (or the Vcom electrode layer) may be referred to as a reference electrode layer.

The substrate 328 is a flexible substrate. Alternatively, the substrate 328 is a rigid substrate. The display layers 350 include one or more polarizers and a color filter glass, among others. The sensor electrodes 105 are disposed on the encapsulation layer 360. In embodiments comprising a lens, the sensor electrodes 105 are disposed on the lens instead of the encapsulation layer 360. The lens may be disposed over the encapsulation layer 360 or included instead of the encapsulation layer 360.

The data lines 222, the gate lines 224, and the emission control lines 223 are disposed in one or more metal layers on the substrate 328. For example, the data lines 222 are disposed in a first metal layer, the gate lines 224 are disposed in a second metal layer, and the emission control lines 223 are disposed in a third line. Alternatively, the gate lines 224 and the emission control lines 223 may be disposed in a common layer. The data lines 222 may be disposed in a metal layer that is above or below a metal layer comprising the gate lines 224 and/or metal layer comprising the emission control lines 223. Further, the gate lines 224 may be disposed in a metal layer that is above or below a metal layer comprising the data lines 222 and/or metal layer comprising the emission control lines 223. The emission control lines 223 may be disposed in a metal layer that is above or below a metal layer comprising the gate lines 224 and/or metal layer comprising the data lines 222.

The sensor electrodes 105 are disposed over the display panel 210. Accordingly, interference generated by the display electrodes of the display panel 210 during display updating may undesirably affect the resulting signals received from the sensor electrodes 105. This interference may be referred to as display interference. For example, driving the data lines 222 with subpixel data signals generates interference that affects the resulting signals received from the sensor electrodes 105. The interference may negatively affect the ability for the input device 100 to detect input objects 140 and/or determine the positional information of the input objects 140. However, the subpixel data signals or information corresponding to the subpixel data signals may be communicated to the sensor driver 104 and/or the determination module 106 to compensate for the interference. Accordingly, the effects of the display interference is mitigated and the ability for the input device 100 to detect the input objects 140 and determine the positional information for the input objects 140 is increased.

Figure 4:
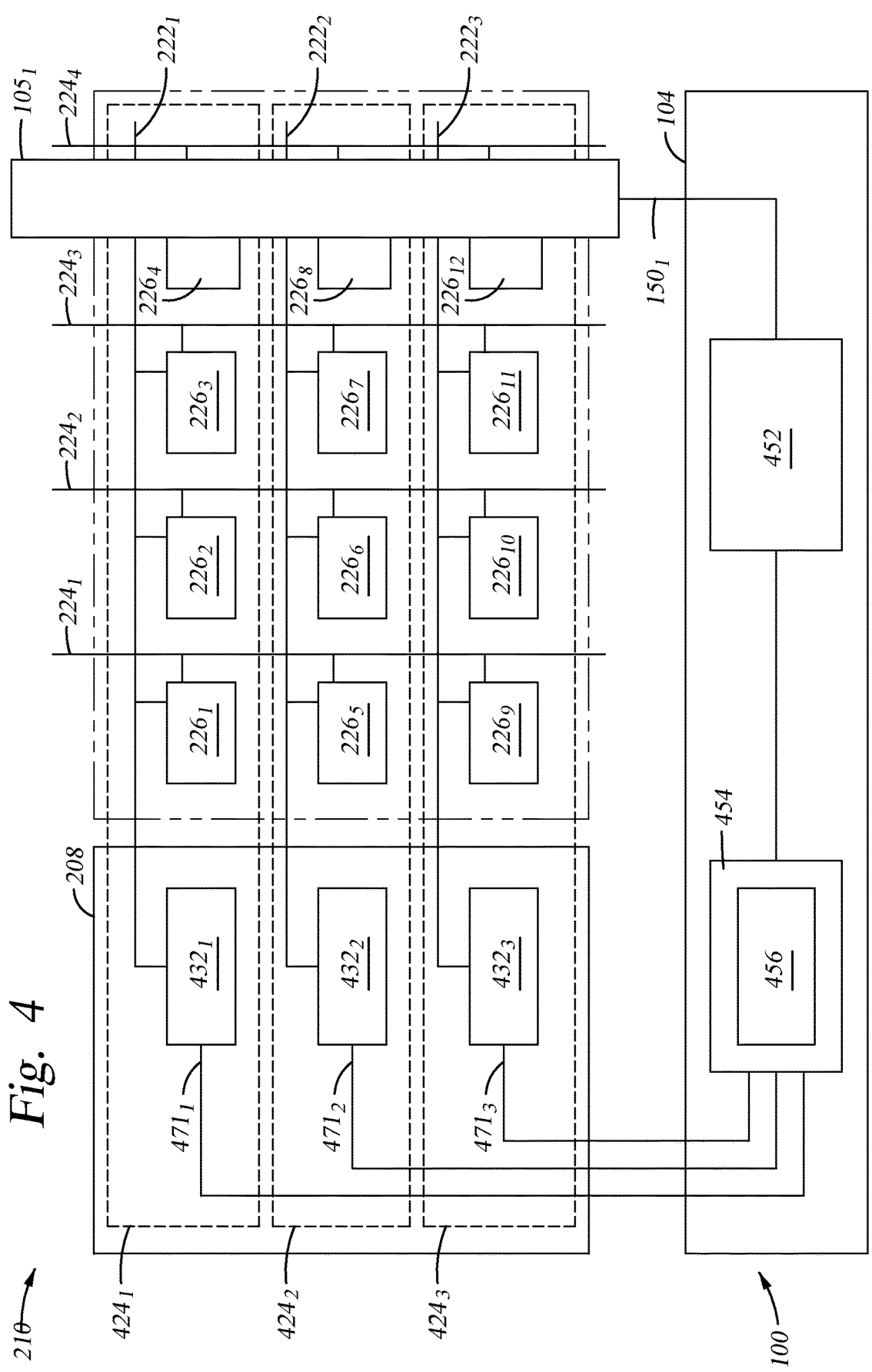
FIGS. 4, 5, and 6 are schematic block diagrams of a portion of a display device and input device, according to one or more embodiments.

FIG. 4 is a schematic illustration of a portion of the input device 100 configured to reduce display interference and the display panel 210, according to one or more embodiments. As illustrated, the display driver 208 includes a plurality of source drivers 432. Each of the plurality source drivers 432 is coupled to one or more data lines 222. For example, the source driver $432_1$ is coupled to the data line $222_1$, the source driver $432_2$ is coupled to the data line $222_2$, and the source driver $432_3$ is coupled to the data line $222_3$. Alternatively, one or more of the plurality of source drivers 432 may be coupled to two or more data lines 222 via a multiplexer. For example, the source driver $432_1$ may be coupled to the data lines $222_1$ and $222_2$.

The sensor driver 104 includes a receiver (e.g., a receiver channel) 452. The receiver 452 is coupled to the sensor electrode $105_1$. For ease of explanation a single sensor electrode $105_1$ and receiver 452 are illustrated, however, in various embodiments, the input device 100 includes two or more sensor electrodes and receivers. In embodiments utilizing two or more receivers, each of the receivers 452 may be connected to a different one of the sensor electrodes 105. Alternatively, two or more receivers 452 may be coupled to a common sensor electrode 105 via a multiplexer.

The receiver 452 receives a resulting signal from the sensor electrode $105_1$ via trace $150_1$ while the sensor electrode $105_1$ is operated for transcapacitive sensing and/or absolute capacitive sensing. When the sensor electrode $105_1$ is operated as a receiver electrode for transcapacitive sensing, a resulting signal acquired from the sensor electrode $105_1$ comprises effects of a transcapacitive sensing signal driven on another one or more of the sensor electrodes 105. When the sensor electrode $105_1$ is operated for absolute capacitive sensing, a resulting signal acquired from the sensor electrode $105_1$ comprises effects of an absolute capacitive sensing signal driven on the sensor electrode $105_1$.

The receiver 452 includes an analog front end (AFE), one or more filters, and an analog-to-digital converter (ADC), among others. The AFE may include an integrator. Alternatively, the receiver 452 may include other circuit elements in addition to or alternative to those listed. The receiver 452 generates sensor data from the resulting signal by processing the resulting signal with one or more of an integrator and processing circuitry of the receiver 452.

The sensor driver 104 further includes an interference mitigation element 454. The interference mitigation element 454 utilizes one or more transfer functions to mitigate interference present in the resulting signals. The interference may be represented as positive and/or negative values within the resulting signals. Further, the interference may have an amplitude that varies over time. For example, in an embodiment where the sensor electrodes 105 are disposed over a display panel (e.g., the display panel 210 of FIG. 2), the amplitude of interference varies with the amplitude of display update signals. Further, the occurrence of the interference corresponds with when display electrodes of the display panel are driven with display update signals.

The interference mitigation element 454 is connected to the source drivers $432_1$, $432_2$, and $432_3$ via connection lines $471_1$, $471_2$, and $471_3$. The interference mitigation element 454 is connected to an output terminal of the source drivers $432_1$-$432_3$, along a corresponding one of the data lines $222_1$-$222_3$, or to a connection line providing input to the source drivers $432_1$-$432_3$. The output terminal of the source drivers $432_1$-$432_3$ that is connected to the data lines $222_1$-$222_3$ may be connected to the interference mitigation element 454 via the connection lines $471_1$-$471_3$. Alternatively, the source drivers $432_1$-$432_3$ may include an output terminal that is connected to the data lines $222_1$-$222_3$, and an output terminal connected to the interference mitigation element 454 via the connection lines $471_1$-$471_3$.

The interference mitigation element 454 receives display data from the display driver 208 and generates an interference compensation signal or signals from the display data. The display data includes subpixel data signals, or at least corresponds to the subpixel data signals. Alternatively, the display data may be based on the image data from which the subpixel data signals are generated.

The interference compensation signal includes an estimate of the display interference generated when the source drivers 432 drive the data lines 222 with subpixel data signals. The interference mitigation element 454 generates the estimate of the display interference by applying one or more transfer functions to the display data. The transfer functions model the circuit characteristics of one or more source driver systems (e.g., the source driver system 424). A source driver system includes a source driver 432, a data line 222 coupled to the source driver 432, a reference electrode (e.g., the cathode electrode 340 or a Vcom electrode of an LCD display device), one or more sensor electrodes 105, and/or a corresponding routing trace or traces 150. 424. Further, the source driver system may include an emission control line 223 and/or circuitry of the display driver 208 coupled to the source driver. As illustrated in FIG. 4, the first source driver system $424_1$ corresponds to the source driver $432_1$, the data line $222_1$, one or more of the gate lines $224_1$-$224_4$, one or more subpixel electrodes $226_1$-$226_4$, and a cathode electrode (e.g., the cathode electrode 340 of FIG. 3). The source driver system $424_2$ corresponds to the source driver $432_2$, the data line $222_2$, one or more of the gate lines $224_1$-$224_4$, one or more subpixel electrodes $226_5$-$226_8$, and a cathode electrode (e.g., the cathode electrode 340 of FIG. 3). The source driver system $424_3$ corresponds to the source driver $432_3$, the data line $222_3$, one or more of the gate lines $224_1$-$224_4$, one or more subpixel electrodes $226_9$-$226_{12}$, and a cathode electrode (e.g., the cathode electrode 340 of FIG. 3). Each of the source driver systems 424 may additionally include the sensor electrode $105_1$ and/or routing trace $150_1$.

A transfer function may be associated with two or more of the source driver systems 424. Alternatively, a different transfer function may be associated with each of the source driver systems 424.

The interference mitigation element 454 determines the transfer function or functions using the circuit characteristics of the source driver systems 424. For example, the interference mitigation element 454 measures the circuit characteristics of the source driver systems 424 and use the measured circuit characteristics to determine the transfer function or functions. Alternatively, the transfer function or functions are determined by modeling the circuit characteristics of the source driver systems 424. In such embodiments, the transfer function or functions are determined during production of the input device 100. The transfer function or functions may be updated to account for changes in the circuit characteristics of the source driver systems by measuring the circuit characteristics of the source driver systems 424. For example, the transfer function or functions are stored within a memory of the sensor driver 104 or an external memory, and accessed and updated by the sensor driver 104 when changes are detected within the transfer function or functions. The changes may be due to changes in temperature and/or properties of the elements of the source drive systems or elements.

The display data corresponding to two or more source drivers 432 may be combined before being communicated to the interference mitigation element 454. For example, the display data for two or more source drivers 432 may be summed or averaged before being communicated to the interference mitigation element 454. The display data may be summed within the display driver 208, the sensor driver 104, or through the use of summation element disposed between the display driver 208 and the sensor driver 104. Alternatively, the display data corresponding to two or more source drivers 432 may be combined after being communicated to the interference mitigation element 454. For example, the display drive data for two or more data lines 222 may be summed or averaged by the adaptive filter 456.

Figure 5:
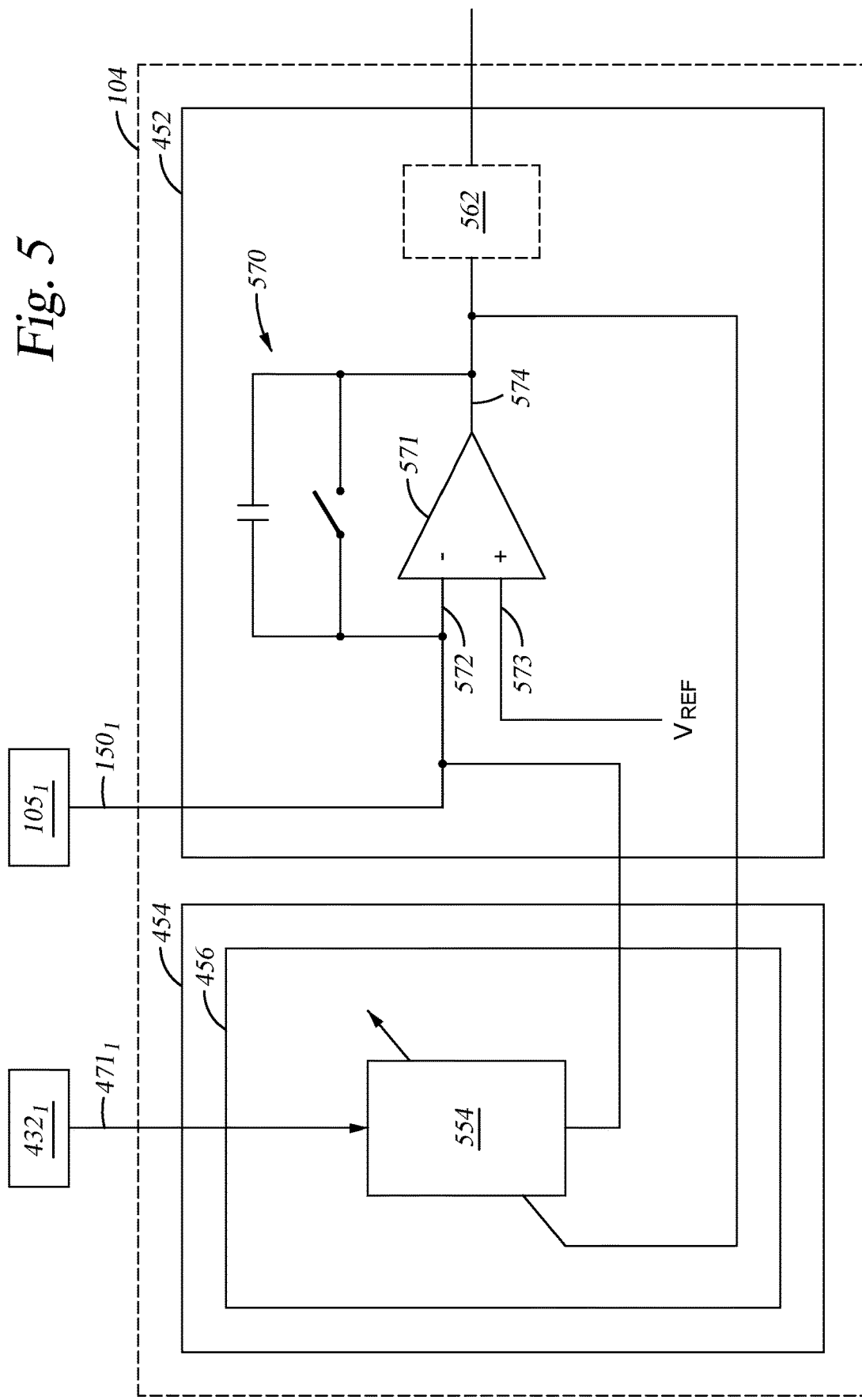

The interference compensation signal or signals generated by the interference mitigation element 454 are communicated to the receiver 452. The receiver 452 utilizes the interference compensation signal or signals to mitigate the effects of display interference within a resulting signal received from the sensor electrode $105_1$. The interference compensation signal may comprise an estimate of interference that is utilized by the receiver 452 to mitigate interference from a resulting signal. In one embodiment, mitigation of the effects of the display interference within the resulting signal occurs before the resulting signal is processed by an analog-to-digital converter (ADC) of the receiver 452. In such an embodiment, the interference compensation occurs in the analog domain. For example, as illustrated in FIG. 5, an interference compensation signal may be applied to the output of the integrator 570 before the being processed by an ADC. Alternatively, mitigation of the effects of the display interference occurs after the resulting signal is processed by an ADC. In such embodiment, the compensation occurs in the digital domain. For example, an interference compensation signal may be applied to the ADC or the output of the ADC.

The interference mitigation element 454 may include an adaptive filter 456. The adaptive filter 456 controls the mitigation of interference within the resulting signals. The adaptive filter 456 generates an estimate of the interference by altering control parameters based on a transfer function and/or functions and the display data, thereby altering the output of the adaptive filter 456. The output of the adaptive filter 456 is interference compensation signal including an interference estimate generated by the interference mitigation element 454. In one example, the adaptive filter 456 is a least means square (LMS) filter. Alternatively, the adaptive filter 456 may be a recursive least squares (RLS) filter, or the like.

For ease of explanation, a single adaptive filter 456 is illustrated. However, the interference mitigation element 454 may include two or more adaptive filters 456. The number of adaptive filters 456 may be the same as the number of the receivers 452. Alternatively, the number of adaptive filters 456 may be based on the number of the receivers 452 and the number of the source drivers 432. For example, the number of adaptive filters 456 may be M×N, where M is the number of the receivers 452 and N is a number of the plurality of source drivers 432. Alternatively, N may be a number of groups formed from the plurality of source drivers 432. The plurality of source drivers 432 may be grouped such that the plurality of source drivers 432 coupled to source electrodes overlapped with by a common sensor electrode are part of a common group.

FIG. 5 is a schematic illustration of the sensor driver 104, according to one or more embodiments. As illustrated in FIG. 5, the adaptive filter 456 includes a finite impulse response (FIR) structure 554. The FIR structure 554 is communicatively coupled to the source driver $432_1$ via connection line $471_1$. In other embodiments, the adaptive filter 456 may include other elements. For example, the adaptive filter 456 may include summation circuitry that compares sensor data from a receiver with the noise estimate from the FIR structure 554.

The receiver 452 includes the integrator 570 and processing circuitry 562. The processing circuitry 562 may include one or more filters, sample and hold circuitry, an ADC, and/or a demodulator. The integrator 570 includes an operational amplifier (op-amp) 571 having an inverting input 572 coupled to the sensor electrode $105_1$ via trace $150_1$ and a non-inverting input 573 driven with reference voltage, Vref. Alternatively, the inverting input 572 may be coupled to a varying voltage signal (e.g., a sensing signal or another modulated signal). The output 574 of the op-amp is coupled to the processing circuitry 562.

The receiver 452 receives a resulting signal from the sensor electrode $105_1$ and generates sensor data. Sensor data may correspond to an output signal of the integrator 570. For example, the integrator 570 may integrate a resulting signal over one or more periods to generate sensor data. Alternatively, the sensor data may correspond to an output of the processing circuitry 562. For example, the sensor data may correspond to one or more digital values generated by the processing circuitry 562.

The inverting input 572 is additionally coupled to an output of the adaptive filter 456. Alternatively, the adaptive filter 456 may be coupled to the input of the processing circuitry 562 or the output of the processing circuitry 562. Further, the output 574 of the integrator 570 is coupled to the FIR structure 554. Alternatively, the FIR structure 554 may be coupled to the output of the processing circuitry 562.

Figure 6:
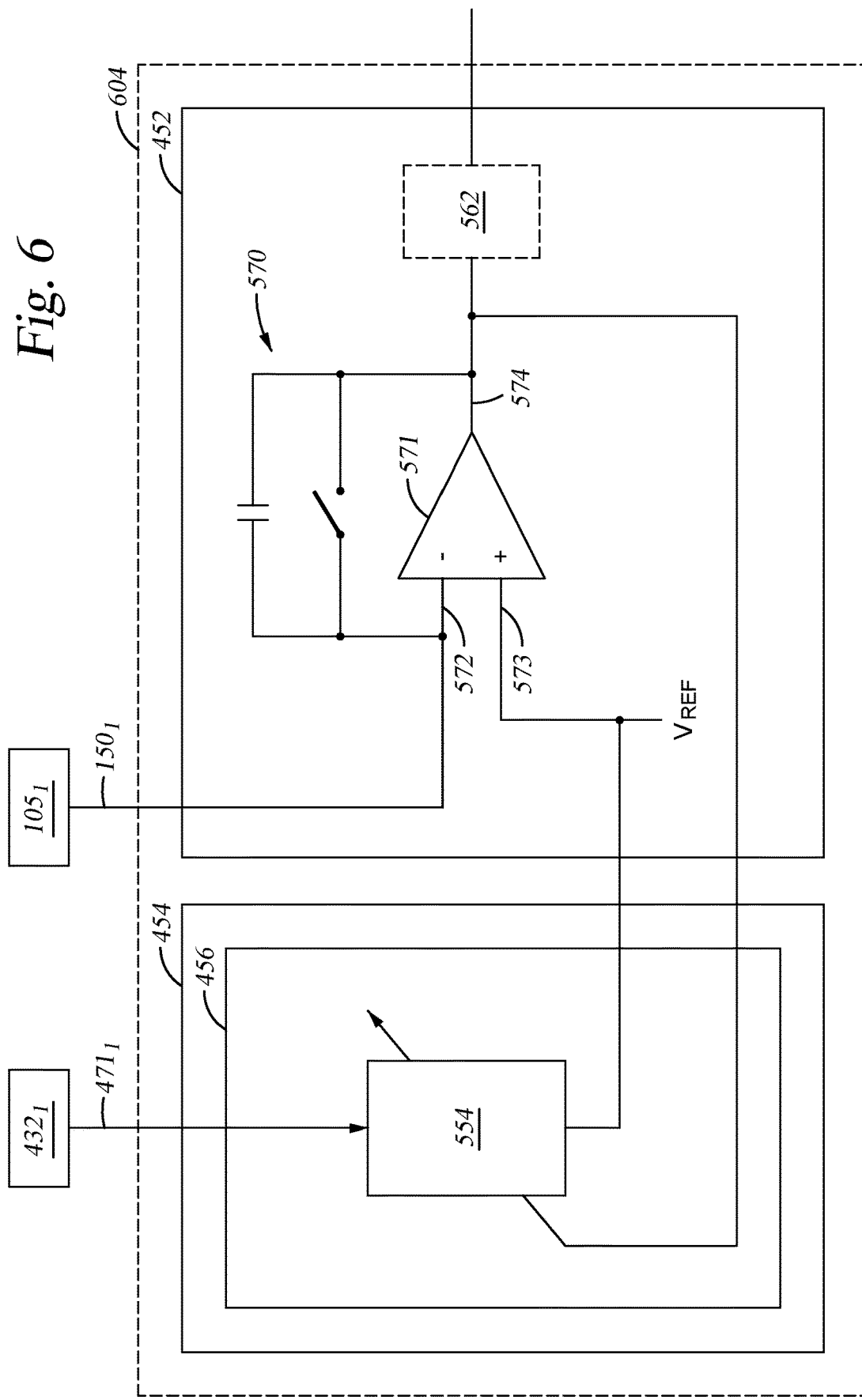

FIG. 6 is a schematic illustration of the sensor driver 604, according to one or more embodiments. The sensor driver 604 is configured similar to, and may replace, the sensor driver 104. For example, the sensor driver 604 includes the receiver 452 and the adaptive filter 456. However, in the embodiment illustrated in Figure tithe output of the adaptive filter 456 is coupled to the non-inverting input 573 of the op-amp 571. For example, the output of the FIR structure 554 is coupled to the non-inverting input 573 of the op-amp 571.

Figure 7:
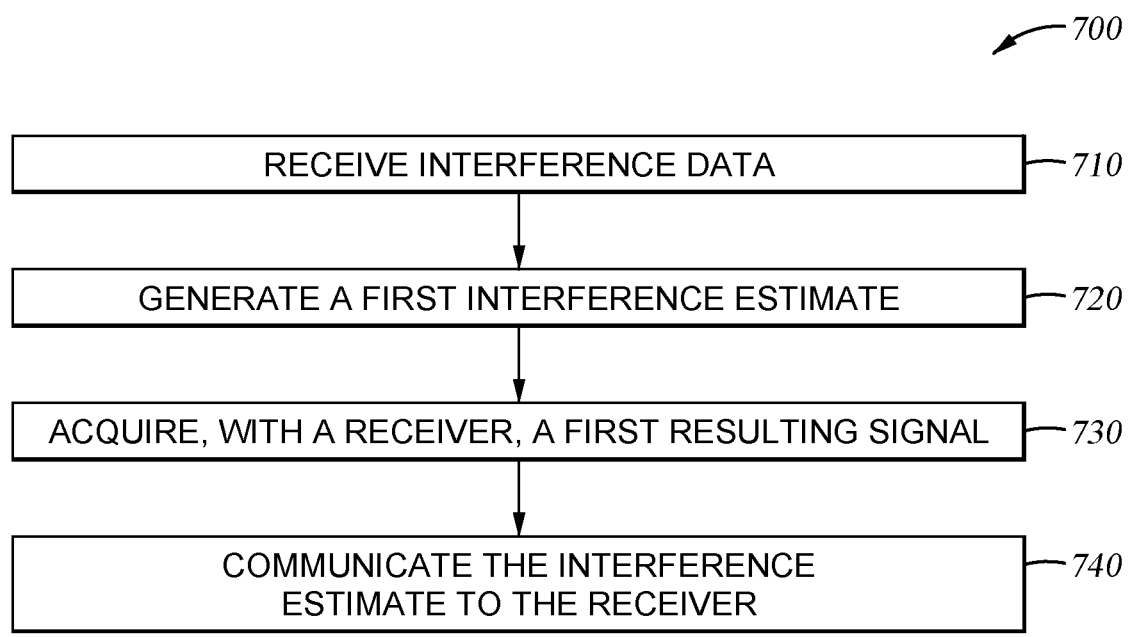
FIGS. 7 and 8 illustrate methods for reducing interference, according to one or more embodiments.

FIG. 7 is a flow chart of a method 700 for mitigating display interference, according to one or more embodiments. With reference to FIG. 4, at operation 710, interference data is received by the interference mitigation element 454. The interference data is display data provided by a display device (e.g., the display device 200) or interference data provided by another device external from the input device 100. In an embodiment where the interference data is display data, the interference mitigation element 454 receives one or more subpixel data signals from one or more source drivers 432. The interference mitigation element 454 receives a first subpixel data signal from the source driver $432_1$ and a second subpixel data signal from the source driver $432_2$. Alternatively, the interference mitigation element 454 receives display data that is a combination of a first subpixel data signal from the source driver $432_1$ and a second subpixel data signal from the source driver $432_2$.

The interference mitigation element 454 may include an adaptive filter 456 and the adaptive filter 456 receives the display data (e.g., subpixel data signals) from a source driver 432. The adaptive filter 456 may include the FIR structure 554 which receives the display data from the source drivers 432.

At operation 720, a first interference estimate is generated. For example, the interference mitigation element 454 generates a first estimate of display interference based on the display data received from the source driver $432_1$ and a first transfer function. The interference mitigation element 454 processes the display data received from the source driver 432 based on the transfer function to generate a first estimate of the display interference. In embodiments where the interference mitigation element 454 includes an FIR structure, the FIR structure 554 generates the first estimate of display interference based on the display data received from the source driver $432_1$. The FIR structure 554 has a transfer function, or impulse response, having a plurality of filter coefficients.

The transfer function may be initially determined during production of the input device 100 through measuring or modelling the circuit characteristics of the source driver systems 424. For example, the filter coefficients of the FIR structure 554 comprise initial values generated during production of the input device 100. Alternatively, the initial values may be based on a model of the expected circuit characteristics. Further, the filter coefficients comprise values generated by the FIR structure 554 before a power cycle and/or a reset cycle of an input device (e.g., the input device 100), a display driver (e.g., the display driver 208) or a sensor driver (e.g., the sensor driver 104). The filter coefficients may comprise values based on the last estimate of display interference that was generated.

At operation 730, a receiver (e.g., the receiver 452) receives a resulting signal from the sensor electrode $105_1$. The sensor electrode $105_1$ is operated for absolute capacitive sensing by modulating the sensor electrode $105_1$ with an absolute capacitive sensing signal. In such an embodiment, the resulting signal includes effects corresponding to the absolute capacitive sensing signal. Alternatively, the sensor electrode $105_1$ is operated as a receiver electrode for transcapacitive sensing and the resulting signal includes effects corresponding to the transcapacitive sensing signal.

At operation 740, the interference mitigation element 454 outputs a first interference compensation signal including the first interference estimate to the receiver 452. The first interference estimate is utilized to mitigate effects of interference within the first resulting signal. The first interference compensation signal subtracts a first amount of charge from the receiver 452 to at least partially mitigate the inference. With reference to FIG. 5, the first interference compensation signal including an estimate of display interference is outputted by the FIR structure 554 of the adaptive filter 456 and received at the inverting input 572 of the integrator 570 of the receiver 452. Alternatively, with reference to FIG. 6, the interference compensation signal including the interference estimate is output to the non-inverting input 573 of the integrator 570 and subtracts an amount of charge from the non-inverting input 573. In another embodiment, the interference compensation signal including the interference estimate is outputted to the output 574 of the integrator 570, subtracting a corresponding amount of charge at the output 574 of the integrator 570. Further, the interference compensation signal including the interference estimate, is communicated to the processing circuitry 562 and an amount of charge corresponding to the interference estimated is removed from within the processing circuitry 562. For example, the interference compensation signal including the interference estimate is received by the processing circuitry 562 after an ADC of the processing circuitry 562 and interference is mitigated in the sensor data after it is processed by the ADC in a digital domain.

The determination module 106 processes the processed resulting signal received from the sensor driver 104 to determine the changes in capacitive couplings of the sensor electrodes, to determine positional information for an input object 140. For example, the determination module 106 processes the processed resulting signal to generate one or more capacitive images as is described above.

Figure 8:
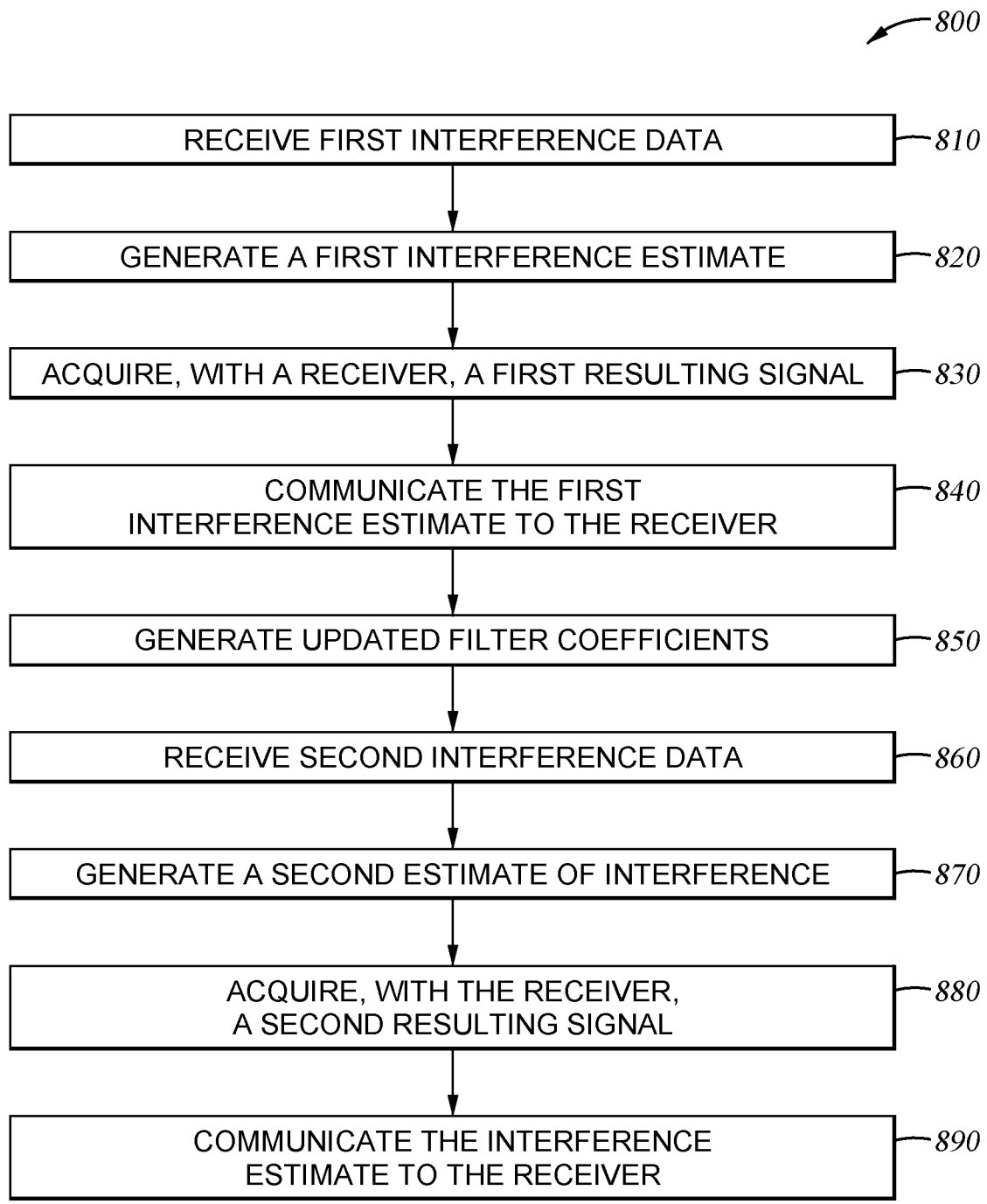

FIG. 8 is a flow chart of a method 800 for removing display interference, according to one or more embodiments. Operations 810, 820, 830, and 840 are similar to operations 710, 720, 730, and 740 as described above with regard to method 700. At operation 850, the filter coefficients of the adaptive filter 456 of the interference mitigation element 454 are updated. For example, the interference mitigation element 454 receives first sensor data from the receiver 452. The first sensor data is generated by applying the first interference estimate to the first resulting signal as is described in operation 740 and 840. The first sensor data is utilized to adjust the filter coefficients of the transfer function of the adaptive filter 456, generating updated filter coefficients. Further, the first interference data (e.g., first display data) received at operation 810 is additionally utilized to adjust the filter coefficients of the transfer function. For example, the first sensor data and/or the first display data is utilized to adjust the filter coefficients of the transfer function of the FIR structure 554 of the adaptive filter 456. In one embodiment, the first sensor data is determined from a resulting signal received from the sensor electrode $105_1$ when no input objects were determined to be in the sensing region of the input device 100. Alternatively, the first sensor data is determined from a resulting signal comprising effects corresponding to one or more input objects 140 in the sensing region of the input device 100.

The first sensor data corresponds to a difference between the amount of charge cancelled by the first estimate of interference and the amount of charge in the first resulting signal received from the sensor electrode $105_1$. In one or more embodiments, the first sensor data generated by the integrator 570 may be compared to the first estimate of interference by summation circuitry within the adaptive filter 456 before charge cancellation is performed at the inverting input 572. Additionally, or alternatively, the first sensor data may be compared to a threshold value. If the first sensor data does not satisfy the threshold value (e.g., meet or exceed the value of the threshold), the interference mitigation element 454 generates another estimate of the interference based on the first interference data. For example, the FIR structure 554 of the adaptive filter 456 generates updated coefficients and a subsequent interference estimate interference based on the difference between the threshold value and first the sensor data. The threshold value is N, where N is greater than or equal to 0.

In various embodiments, updating the filter coefficients comprises tuning the adaptive filter 456. Tuning the adaptive filter 456 comprises adjusting the filter parameters of the adaptive filter based on the sensor data and/or display data. Accordingly, the adaptive filter 456 is tuned once every N display frames, where N is one or more. Additionally, or alternatively, the adaptive filter 456 is tuned at power on or wake up of the input device 100, power on or wake up of the display driver 208, power on or wake up of the sensor driver 104, after a reset of the sensor driver 104, and/or after a change in sensing mode of the sensor driver 104 (e.g., a change between transcapacitive sensing and absolute capacitive sensing). The adaptive filter 456 may be tuned once every M capacitive frames, where M is one or more. Further, tuning of the adaptive filter 456 may occur when no input object is determined to be present within the sensing region of the input device 100.

At operation 860, second interference data is received by the interference mitigation element 454. The second interference data is second display data provided by a display device (e.g., the display device 200) or second interference data provided by another device external from the input device 100. In an embodiment where the second interference data is second display data, the interference mitigation element 454 receives one or more subpixel data signals from one or more source drivers 432. The interference mitigation element 454 receives a third subpixel data signals from the source driver $432_1$ and a fourth subpixel data signals from the source driver $432_2$. Alternatively, the interference mitigation element 454 receives display data that is a combination of a third subpixel data signal from the source driver $432_1$ and a fourth subpixel data signal from the source driver $432_2$.

At operation 870, a second interference estimate is generated by the interference mitigation element 454. For example, the interference mitigation element 454 generates a second estimate of display interference based on the second display data received from the source driver $432_1$ and the updated filter coefficients. The interference mitigation element 454 processes the second display data received from the source driver 432 based on a transfer function and the updated filter coefficients to generate the second estimate of the display interference. The second display data functions as an input to the transfer function.

At operation 880 the receiver 452 receives a second resulting signal from the sensor electrode $105_1$. The sensor electrode $105_1$ is operated for absolute capacitive sensing by modulating the sensor electrode $105_1$ with an absolute capacitive sensing signal. In such an embodiment, the second resulting signal includes effects corresponding to the absolute capacitive sensing signal. Alternatively, the sensor electrode $105_1$ is operated as a receiver electrode for transcapacitive sensing and the resulting signal includes effects corresponding to the transcapacitive sensing signal.

At operation 890, the interference mitigation element 454 outputs a second interference compensation signal comprising the second interference estimate to the receiver 452. The second interference estimate may be utilized to mitigate effects of interference within the second resulting signal. The second interference compensation signal removes (e.g., subtracts) an amount of charge corresponding to the second interference estimate from the receiver 452 to at least partially mitigate the inference within the second resulting signal based on the second interference estimate. With reference to FIG. 5, the second interference compensation signal including the second estimate of display interference is output by the FIR structure 554 of the adaptive filter 456 and received at the inverting input 572 of the integrator 570 of the receiver 452. Alternatively, with reference to FIG. 6, the second interference compensation signal including the second interference estimate is output to the non-inverting input 573 of the integrator 570 and an amount of charge corresponding to the second interference estimated is removed from the non-inverting input 573. In another embodiment, the second interference compensation signal including the second interference estimate is output to the output 574 of the integrator 570, subtracting a corresponding amount of charge at the output 574 of the integrator 570. Further, the second interference compensation signal including the second interference estimate is communicated to the processing circuitry 562 and an amount of charge corresponding to the second interference estimated is removed from within the processing circuitry 562. For example, the interference compensation signal including the interference estimate is received by the processing circuitry 562 after an ADC of the processing circuitry 562 and interference is mitigated in the sensor data after it is processed by the ADC in a digital domain. In the above described embodiments, display interference is mitigated from the second processed resulting signal, and the second sensor data generated by the receiver 452 may be referred to as an interference mitigated sensor data.

In one embodiment, after operation 820, the filter coefficients are fixed, and the operation 850 may be omitted from the method 800. For example, in response to the sensor data satisfying the threshold, the filter coefficients are fixed. In such an embodiment, interference estimates are generated based the corresponding transfer function and the display data received from the source driver 432; however, the filter coefficients are not adjusted. For example, an interference estimate may be generated from the fixed filter coefficients and corresponding display data, and utilized to remove interference from a second resulting signal, and/or subsequent resulting signals. Alternatively, the filter coefficients may be updated in response to receive a new resulting signal and/or display data.

The determination module 106 receives the processed first and/or second resulting signal received from the receive 452 to determine the changes in capacitive couplings of the sensor electrodes, to determine positional information for an input object 140. For example, the determination module 106 processes the interference mitigated sensor data to generate one or more capacitive images as is described above.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A sensor driver comprising:
    a receiver circuit configured to acquire a resulting signal from a sensor electrode, wherein the resulting signal comprises noise and a signal indicative of presence of an input object; and
    an interference mitigation circuit communicatively coupled with the receiver circuit, the interference mitigation circuit configured to:
        receive interference data, wherein the interference data is display data;
        generate, by applying a transfer function to the interface data, an interference estimate, wherein the transfer function models circuit characteristics of a source driver system including a source driver of a display driver and the sensor electrode; and
        communicate the interference estimate to the receiver circuit,
    wherein the receiver circuit receives the resulting signal and removes the noise therefrom at the receiver circuit according to the interference estimate.

2. The sensor driver of claim 1, wherein the interference mitigation circuit is configured to be coupled to the display driver, and wherein the interference data is received from the display driver.

3. The sensor driver of claim 2, wherein the interference mitigation circuit is configured to be coupled to the source driver of the display driver, and the display data is a subpixel data signal received from the source driver.

4. The sensor driver of claim 1, wherein the interference mitigation circuit comprises:
    an adaptive filter configured to receive the interference data and generate the interference estimate.

5. The sensor driver of claim 4, wherein the adaptive filter is further configured to receive sensor data corresponding to the resulting signal from the receiver circuit, and the interference estimate is further based on the sensor data.

6. The sensor driver of claim 5, wherein the adaptive filter is a finite impulse response structure.

7. The sensor driver of claim 6, wherein the finite impulse response structure comprises filter coefficients, and wherein the filter coefficients are adjusted based on the sensor data.

8. The sensor driver of claim 1, wherein the transfer function further corresponds to one or more circuit characteristics selected from the group consisting of a data line of a display panel and a reference electrode of the display panel.

9. An input device comprising:
    a sensor electrode; and
    a processing system comprising:
        a sensor driver communicatively coupled to the sensor electrode, the sensor driver comprising:
            a receiver circuit configured to acquire a resulting signal from the sensor electrode, wherein the resulting signal comprises noise and a signal indicative of presence of an input object; and
            an interference mitigation circuit communicatively coupled with the receiver circuit, the interference mitigation circuit configured to:
                receive interference data, wherein the interference data is display data;

generate, by applying a transfer function to the interface data, an interference estimate, wherein the transfer function models circuit characteristics of a source driver system including a source driver of a display driver and the sensor electrode; and communicate the interference estimate to the receiver circuit, wherein the receiver circuit receives the resulting signal and removes the noise therefrom at the receiver circuit according to the interference estimate.

10. The input device of claim 9, wherein the interference mitigation circuit is configured to be coupled to the display driver, and wherein the interference data is received from the display driver.

11. The input device of claim 10, wherein the interference mitigation circuit is configured to be coupled to the source driver of the display driver, and the display data is a subpixel data signal received from the source driver.

12. The input device of claim 9, wherein the interference mitigation circuit comprises an adaptive filter configured to receive the interference data and generate the interference estimate.

13. The input device of claim 12, wherein the adaptive filter is further configured to receive sensor data corresponding to the resulting signal from the receiver circuit and the interference estimate is further generated based on the sensor data.

14. The input device of claim 13, wherein the adaptive filter is a finite impulse response structure.

15. The input device of claim 14, wherein the finite impulse response structure comprises filter coefficients, and wherein the filter coefficients are adjusted based on the sensor data.

16. The input device of claim 9, wherein the transfer function further corresponds to one or more circuit characteristics selected from the group consisting of a data line of a display panel and a reference electrode of the display panel.

17. A method for mitigating interference, the method comprising:

acquiring, by a receiver circuit, a resulting signal from a sensor electrode, wherein the resulting signal comprises noise and a signal indicative of presence of an input object;

receiving, by an interference mitigation circuit, interference data, wherein the interference data is display data;

generating, by the interference mitigation circuit applying a transfer function to the interface data, an interference estimate, wherein the transfer function models circuit characteristics of a source driver system including a source driver of a display driver and the sensor electrode;

communicating the interference estimate from the interference mitigation circuit to the receiver circuit;

receiving, at the receiver circuit, the resulting signal; and removing, at the receiver circuit, the noise from the resulting signal according to the interference estimate.

18. The method of claim 17, wherein the interference data is received from the display driver.

19. The method of claim 17 further comprising receiving, by an adaptive filter of the interference mitigation circuit, sensor data corresponding to the resulting signal from the receiver circuit, and wherein the interference estimate is further generated based on the sensor data.

20. The method of claim 19, wherein the adaptive filter is a finite impulse response structure having filter coefficients, and wherein the filter coefficients are adjusted based on sensor data.

* * * * *